United States Patent
Simmerlein

(10) Patent No.: US 11,224,108 B2
(45) Date of Patent: Jan. 11, 2022

(54) METHOD OF CONTROLLING A SYNCHRONUS, DISTRIBUTED EMISSION OF LIGHT

(71) Applicant: Steinberg Media Technologies GmbH, Hamburg (DE)

(72) Inventor: Frank-Ulrich Simmerlein, Hamburg (DE)

(73) Assignee: STEINBERG MEDIA TECHNOLOGIES GMBH

( * ) Notice: Subject to any disclaimer, the term of this patent is extended or adjusted under 35 U.S.C. 154(b) by 0 days.

(21) Appl. No.: 17/078,476

(22) Filed: Oct. 23, 2020

(65) Prior Publication Data

US 2021/0127473 A1 Apr. 29, 2021

(30) Foreign Application Priority Data

Oct. 24, 2019 (EP) ..................................... 19205026

(51) Int. Cl.
| | |
|---|---|
| *H05B 47/155* | (2020.01) |
| *H04W 4/029* | (2018.01) |
| *H05B 47/19* | (2020.01) |
| *H05B 47/105* | (2020.01) |
| *H04W 4/021* | (2018.01) |

(52) U.S. Cl.
CPC .......... *H05B 47/155* (2020.01); *H04W 4/021* (2013.01); *H04W 4/029* (2018.02); *H05B 47/105* (2020.01); *H05B 47/19* (2020.01)

(58) Field of Classification Search
None
See application file for complete search history.

(56) References Cited

U.S. PATENT DOCUMENTS

| | | |
|---|---|---|
| 709,080 A | 9/1902 | Dunn |
| 10,681,198 B2 | 6/2020 | Wright et al. |
| 2005/0275626 A1 | 12/2005 | Mueller et al. |
| 2014/0184386 A1 | 7/2014 | Regler et al. |

(Continued)

FOREIGN PATENT DOCUMENTS

| | | |
|---|---|---|
| EP | 1729615 B1 | 5/2019 |
| WO | 2008010229 | 1/2008 |

(Continued)

*Primary Examiner* — Anh Q Tran
(74) *Attorney, Agent, or Firm* — Sand, Sebolt & Wernow Co., LPA

(57) ABSTRACT

A method for controlling a synchronous, distributed emission of light. A luminous bracelet which is distributed to the audience of a concert is known from the prior art. The problem to be solved is increased integration of the visitors into an audio-visual performance without having to distribute a large number of special devices. The problem is solved by emitting synchronous, distributed light from a plurality of portable personal devices, especially smart devices, wherein setting up of each portable personal device is initiated by the respective portable personal device contacting a control system, particularly a radio network, and the synchronous, distributed emission of light by the plurality of portable personal devices is caused by transferring at least one first piece of information regarding timing and/or at least one second piece of information for color control of the emission of light is effected by the control system.

20 Claims, 5 Drawing Sheets

(56) References Cited

U.S. PATENT DOCUMENTS

| | | | |
|---|---|---|---|
| 2016/0073484 A1* | 3/2016 | Czapla | H05B 47/16 |
| | | | 315/323 |
| 2017/0135057 A1* | 5/2017 | Cugini | H05B 47/10 |
| 2018/0077276 A1 | 3/2018 | Wright | |
| 2018/0092188 A1* | 3/2018 | Niu | H04W 4/08 |
| 2020/0059705 A1 | 2/2020 | Tsukaya et al. | |

FOREIGN PATENT DOCUMENTS

| | | |
|---|---|---|
| WO | 2014096861 | 6/2014 |
| WO | 2018112632 | 6/2018 |
| WO | 2018213171 | 11/2018 |

\* cited by examiner

METHOD OF CONTROLLING A SYNCHRONUS, DISTRIBUTED EMISSION OF LIGHT

TECHNICAL FIELD

The present invention relates to a method for controlling a synchronous, distributed emission of light within an event site, particularly during an audio-visual performance, particularly a live performance.

BACKGROUND

Background Information

In general, it is common nowadays that an artist tries to let the audience of this performance participate as actively as possible in the context of his or her audio-visual performance, particularly to actively integrate the audience into the performance. For example, so-called flash mobs, such as the simultaneous freezing of around 200 people at a train station in New York City for five minutes, have been enjoying increasing popularity since the beginning of the 20th century. There is therefore a need for people to participate in the performance themselves, particularly to integrate themselves into it. Another example of how the audience of an audio-visual performance is encouraged to actively participate is the interaction of a musician or band during a live concert. It is not uncommon for the audience to be encouraged to sing individual text passages or, for example, be asked to hold a lighter in the air or to participate in a choreography.

Accordingly, there is an increasing need to enable the audience to participate in an audio-visual performance interactively, in order to make the performance as interesting as possible from the audience's point of view.

WO 2018/213171 A1 describes a method for sending real-time data in a network, used for the transfer of audio data to a mobile audio playback device of a concert-goer during a live concert. The focus here is mainly on transferring the live music of a live performance with the lowest possible latency to the mobile audio playback devices of the concert-goers in order, for example, to present the audio performance to the participant using headphones at the desired volume. WO 2018/213171 A1 in this respect discusses "live streaming" of the audio files within a concert to at least some of the concert-goers, but particularly streaming over the Internet or the like, although it also addresses the option to synchronize these audio files with a video file, for example, a video recording of the concert, particularly also under the aspect of making it accessible via the Internet or the like to a user, regardless of their presence at the concert. Synchronization of the individual mobile audio playback devices with one another is not explicitly dealt with.

Many other documents can be found in the prior art which deal with the basic concept of synchronization when generating audio and/or deal with other multimedia files. For example, U.S. Pat. No. 709,080 B2 describes a method for synchronizing the audio input of several musicians into a synchronous audio output with regard to live performances. The synchronous audio output generated is distributed to the end users, although no further information can be found about this distribution.

In contrast, WO 2008/010229 A1, for example, describes streaming of a multimedia signal between the source and the terminals. A terminal is synchronized with the source through the use of time stamps in relation to a reference time of a clock and the periodic adjustment thereof.

In all of these documents, the main focus is on the transfer of audio files, so that, for example, the active involvement or inclusion of concert-goers is not an issue at a live concert.

Documents US 2005/0275626 A1 and EP 1 729 615 B1, on the other hand, deal with a possibility for computer-based lighting control, but particularly with respect to the transfer of video signals in a network by a central control unit via a user interface, wherein the user is not a concert-goer, but a lighting technician or the like. The basic idea of, for example, integrating a plurality of devices of the concert-goers into the lighting control as well is addressed at least insofar as the video signal or the like can be sent to a mobile phone or similar electronic device of a user. Here, too, the visitor to an audio-visual performance is therefore not integrated into it or encouraged or enabled to participate interactively.

A much greater involvement of the audience is described in US 2014/0184386 A1. It relates to a luminous bracelet which can be distributed to the visitors of a concert or another live performance or audio-visual performance. The bracelets include a receiver and a memory in which information about certain lighting patterns is stored, which can be activated by means of the receiver and can cause the bracelet to glow. By sending an activation code, the bracelet can be caused to glow using the stored information. But the concert-goer does not have a chance to interact here. It is also necessary to acquire and distribute the bracelets.

SUMMARY

The problem to be solved therefore is to achieve stronger involvement of the visitors of an audio-visual performance, even without having to distribute a large number of special devices, particularly to actively integrate the visitors into the concept of emitting light during an audio-visual performance and to integrate this involvement as an active element into the overall audio-visual performance.

The problem is solved by a method for controlling a synchronous, distributed emission of light within an event site, particularly during an audio-visual performance, particularly a live performance, by means of a control system, wherein the synchronous, distributed light may be emitted by a plurality of portable personal devices, particularly smart devices, each including at least one light source, particularly a display, wherein the plurality particularly may be at least one hundred, wherein the control system may be configured to control and/or to synchronize the emission of light by the plurality of portable personal devices, wherein the control system may be adapted to communicate with the portable personal devices by means of a radio network, particularly via a cellular network, particularly via the Internet, wherein the mobile devices may be set up to receive, particularly implement, control instructions from the control system via the radio network, particularly to be implemented into the synchronous, distributed emission of light, wherein the setting up of each of the portable personal devices may be triggered by the respective portable personal device contacting the control system, particularly the radio network, particularly by connecting to the radio network, and wherein the synchronous, distributed emission of light by the plurality of portable personal devices may be effected by transferring at least one first piece of information regarding timing and/or at least one second piece of information regarding color control of the emission of light from the control system via the radio network to the plurality of portable personal devices.

Advantageous further developments include that the method is characterized in that the control system, may controls and/or causes a time synchronization between portable personal devices and the audio-visual performance, wherein the synchronous, distributed emission of light may be synchronized in time with the delivery of at least one audio output, particularly click track, and/or at least one emission of light by a plurality, particularly stationary, light emission devices on the event site, particularly the stage, wherein the emission and/or delivery particularly may be effected by means of the control system. The method may be further characterized in that the control system may control and/or cause a time synchronization between portable personal devices and the audio-visual performance, wherein the synchronous, distributed emission of light may be synchronized in time, with the delivery of at least one instruction, wherein particularly the at least one instruction may be presented to at least one musician by means of a display and/or a headphone, wherein the at least one instruction particularly may be a song text, grip pattern, and/or time, and/or notes, and/or chords, and/or a text statement, and/or a playback, and/or a counter, particularly an optical counter.

The method may further be characterized in that the control system may be connected to, and/or communicate with, a module for generating at least one time marker, wherein the module may be adapted to record and/or to analyze the audio output by means of the module, wherein the at least one time marker may be generated by capturing and/or analyzing the audio output, wherein the at least one time marker may be transferred to the control system, wherein the control system may be adapted to generate and send, particularly to transfer the at least one first and/or second piece of information based on the at least one time marker. The method may further be characterized in that the control system may be connected to a radio base station and/or includes the radio base station, wherein the radio base station may be adapted to communicate with the portable personal devices via the radio network, whereby the control system may be adapted to communicate with the portable personal devices via the radio base station using the radio network. The method may be further characterized in that the at least one first piece of information for the timing of the emission of light may be a time at which the emission of light starts and/or for starting a routine for emitting light and/or the at least one second piece of information includes at least one parameter of the light, wherein the at least one a parameter of the light may be color and/or intensity and/or the at least one first and the at least one second pieces of information together define the temporal sequence of the emission of light, particularly of different colors, and/or define a routine for the temporal sequence of the emission of light, particularly of different colors.

The method may further be characterized in that the first piece of information, the second piece of information, the temporal sequence, the routine for emitting light and/or the at least one parameter of the light may be transferred from the control system via the radio network to the portable personal devices and, particularly, may be stored on the portable personal devices, wherein the first piece of information particularly may be a start instruction to the portable personal devices via the radio network, particularly to trigger the stored routine, for emitting light and/or for using the parameters of the light to emit light, wherein the start instruction may be an instruction to emit light or to start the stored routine for emitting light and/or for using the parameters of the light at a time defined by the start instruction, particularly defined by a time interval. The method may further be characterized in that the control system may initialize and/or start the transfer of the first and/or the second piece of information at least 100 ms, particularly at least 500 ms, before the time defined by the start instruction and/or begins with such a lead time that, if the process runs smoothly, the completion of the transfer of the first and/or the second piece of information may be expected at least 100 ms, particularly at least 500 ms, before the time defined by the start instruction.

The method may further be characterized in that the plurality of portable personal devices may be divided into N groups, wherein N is at least two, and wherein each of the N groups particularly includes at least fifty portable personal devices. The method may further be characterized in that the division into N groups is based on the position of the portable personal devices within the event area, wherein the position of the portable personal devices is determined by i) a seat and/or a seat designation, wherein particularly a code is used for detecting and/or assigning the seat and/or the seat designation, wherein the code is particularly a barcode, QR code, and/or RFID code attached to an admission ticket and/or, particularly directly, on or to the seat, and/or ii) triangulation and/or distance measurement between the portable personal devices and at least two, particularly stationary, base stations and/or radio antennas within the event site, and/or iii) using GPS, and/or iv) detecting access points, particularly radio antennas, at which the portable personal devices receive access to the radio network and/or dial into the radio network and/or log in, and/or v) detecting neighboring radio network subscribers, particularly portable personal devices, wherein a first number of portable personal devices that may be adjacent and/or the positions of which may be in a first geographical zone within the event site and/or which get access to the radio network and/or dial and/or log into the radio network via a first base station and/or radio antenna, may be assigned to a first group of the N groups and a second number of portable personal devices that may be adjacent and/or the positions of which may be in a second geographical zone within the event site, and/or which get access to the radio network and/or dial and/or log into the radio network via a second base station and/or radio antenna are assigned to a second group of the N groups.

The method may be further characterized in that the emission of light by portable personal devices within each of the N groups, particularly deviating from other groups of the N groups, may be synchronized, wherein the emission of light by a first group of the N groups differs in time, particularly with respect to a start time for the emission of light, and/or with respect to at least one parameter of the light, from the emission of light by at least one second group of the N groups. The method may further be characterized in that there may be X subgroups within the N groups, wherein the position of the portable personal devices relative to one another may be analyzed in order to assign the portable personal devices within one of the N groups to one of the X subgroups, particularly with respect to their order, neighborhood, and/or spatial distribution within the one group of the N groups, wherein the assignment to the X subgroups may be particularly alternating, segment-by segment, and/or following a pattern. The setup may include integration into the radio network, allocation of a, particularly, unique, identification in the radio network, allocation of a, particularly, unique, address in the radio network and/or announcing at least one server address of the control system to each of the portable personal devices. The method may further include an adjustment, particularly the synchronization of at least one clock generator, particularly a dock, of the control system with at least one clock generator, particularly a clock, in each of the portable personal devices, particularly in the context of setting up and/or before the time defined by the start instruction and/or the method performs the adjustment, particularly the synchronization of at least one clock generator, particularly a clock, of the control system using the time of at least one public cellular network that can be received on the event site. The adjustment, particularly the synchronization, may be repeated several times and/or first and second pieces of information may be transferred to each of the portable personal devices a number of times in temporal sequence, and thereby particularly defining a new time by the start instruction and/or wherein the routine, sequence and/or process may be stored together with audio signals and/or information about their generation and loaded into, and/or by the control system from the Internet, from a data memory and/or via a data connection, particularly independently of the radio network and/or the portable personal devices.

The method according to the invention is used to control a synchronous, distributed emission of light within an event site, particularly during an audio-visual performance, particularly a live performance, by means of a control system. Synchronous distributed light is emitted by a plurality of portable personal devices, particularly smart devices, particularly smartphones and/or tablets, each including at least one light source, particularly a display, particularly, the plurality is at least one hundred. The control system can particularly include a sequencer and/or a control unit and/or means that allow the plurality of portable personal devices to access a network, particularly a radio network, particularly for configuring the access, for configuring the plurality of portable personal devices, for delivering and/or receiving data and/or information. The control system is also configured to control and/or to synchronize the emission of light by the plurality of portable personal devices. In addition, the control system, especially the sequencer and/or the control device, is also adapted to communicate with the portable personal devices by means of the radio network, particularly via a cellular network, particularly via the Internet.

Furthermore, the mobile devices are set up to receive, particularly convert, control instructions from the control system via the radio network, particularly to convert them into the synchronous, distributed output of light. The setting up of each of the portable personal devices is initiated by the respective portable personal device making contact with the control system, particularly with the at least one radio network, particularly by connecting to the radio network. Setting up can also include registration and/or configuration of the portable personal device in the radio network, particularly at least also by means of an app, particularly an app stored on a smart device, and/or by means of a web application, particularly by registering with it, and/or by capturing and/or scanning a code, the registration and/or configuration being initiated particularly by the user, but after the initiation, for example by capturing a code, a period of time can pass until setup and the end of that period can be marked, for example, by the portable device making contact with the radio network. The portable personal device can particularly be assigned an IP as part of contacting and/or setting up. But this is not required. Setting up can for example also consist of, or include, other measures, such as notifying a server to retrieve the information and/or synchronization of a timer. Also, not only a local radio network but also a regular mobile radio network can be used for setting up the portable personal devices, particularly for the transfer of a basic configuration, for example including a network name and/or a server address of the control system and/or local radio network. Setting up is particularly meant to include that, by making contact, which particularly takes place actively by the owners of the portable personal devices, the control system is enabled to transfer information to the portable personal devices, particularly to send instructions to the portable personal devices, particularly, to control functions of the portable personal devices, particularly selected by the owner, wherein the portable personal devices execute this information and/or these instructions, particularly automatically, especially without the owner having to approve and/or instruct this. It is particularly advantageous here to establish contact by logging in, particularly by scanning a code, particularly a code printed on an admission ticket, by means of and/or in an app, which is transferred to, and/or stored on, the portable personal devices, particularly by logging into the radio network, or which was already stored on the portable personal devices before logging into the radio network. This registration then enables information to be exchanged between the control system and portable personal devices.

The synchronous, distributed emission of light by the plurality of portable personal devices is brought about by transferring at least one first piece of information for timing control and at least one second piece of information for color control of the emission of light from the control system via the radio network to the plurality of portable personal devices.

In an advantageous embodiment, the control system is connected to a radio base station and/or it includes such a radio base station, the radio base station being arranged to communicate with the portable personal devices via the radio network, whereby the control system is arranged to communicate with the portable personal devices via the radio base station via the radio base station. Particularly, the radio base station is advantageously suitable and/or adapted to form a radio network with the plurality of portable personal devices, particularly just a local, particularly a radio network substantially or entirely restricted to the event site and/or an area in a radius of less than 5 km, particularly less than 1 km, particularly less than 500 m. The local radio network is particularly self-sufficient and/or does not allow roaming and/or delivery to the local and/or cellular network. In itself, however, the radio network can also be a cellular network, particularly a 4G and/or 5G network.

It is particularly advantageous that the at least one first piece of information for timing control of the emission of light is a point in time for starting the emission of light and/or for starting a routine for emitting light. This point in time can be a future time or the current time, also referred to as an immediate point in time, so that the first information is an instruction for the immediate emission of light and/or the immediate start of the routine for emitting light, or a later time, particularly a time or a time interval based on a defined time or a defined point in time, so that the first information is the time for the emission of light and/or for starting the routine for the emission of light, particularly with respect to a synchronized clock, wherein this point in time is particularly in the future, and the emission of light and/or the start of the routine for emitting light, particularly in a time interval or at a point in time, particularly a point in time or a time of day, is defined by the first information. If the first information defines a future point in time and/or a future time of day, prior synchronization of the clocks of the control system and portable personal devices is particularly advantageous and/or it is advantageous to determine and/or take into account a difference between the clocks, particularly to adjust the point in time and/or time of day to this difference.

Additionally or alternatively, the at least one second piece of information includes at least one parameter that specifies at least one property of the light, particularly color and/or intensity, and/or the at least one first and the at least one second pieces of information together define the temporal sequence of the emission of light, particularly of different colors, and/or a routine for the temporal sequence of the emission of light, particularly of different colors, as well as its start.

Routines can be used multiple times and/or can, particularly for later starts, particularly a restart after the routine has already been started once, be advantageously stored on the portable personal devices. Advantageously, the routines are transferred to, and/or stored on, the portable personal devices during setup and/or at least 100 ms before the desired point in time for emitting light, so that they can be started by an immediate instruction or at a transferred point in time, particularly a time of day, without the need to transfer the entire routine at the time of the planned execution. This is particularly advantageous because in this way the complexity of the information to be transferred by the control system at certain times can be reduced, since the information required to start the routine can be a simple activation code. This is particularly relevant when only limited network capacity is available for transferring data and/or information in the radio network and particularly the number of portable personal devices is large, wherein the ratio between network capacity and the plurality of portable personal devices is of particular relevance.

Advantageously, the second piece of information, the temporal sequence, the routine for emitting light and/or the at least one parameter of the light is, transferred from the control system via the radio network to the portable personal devices and, particularly, stored on the portable personal devices. Advantageously, at least one color is stored as a parameter of the light to be emitted. The control system then sends, particularly transfers, a start instruction for triggering the stored routine for emitting light and/or for using the parameters of the light to emit light via the radio network to the portable personal devices, wherein particularly the first information is or includes a start instruction, and the start instruction in addition includes which of the multiple second pieces of information, timing, routines for emitting light, and/or parameters of the light used are to be used and/or triggered by, means of the first information, particularly in the event that several second pieces of information, temporal sequences, routines for emitting light and/or parameters of the light were stored on the portable personal devices. The start instruction can be an instruction to emit light or to start a stored and/or previously sent and/or transferred routine for emitting light, and/or to use the parameters of the light at a time defined and/or transferred by the start instruction. If the start instruction includes a point in time defined and/or transferred by the start instruction, this point in time is to be coordinated particularly with the latencies during the transfer within the radio network, and this point in time should be more than the expected latency, particularly more than twice the expected latency, after the point in time when the transfer began. So the point in time defined and/or transferred by the start instruction can be selected, for example, in such a way that, with a latency of 100 ms within the radio network, the first information, the second information, the temporal sequence, the routine for emitting light and/or the at least one parameter of the light is sent from, the control system to the portable personal devices via the radio network at least 250 ms before the desired point in time for emitting light. Alternatively, the start instruction can include an instruction for an immediate, particularly instant, emission of light or for an immediate, particularly instant, starting of the stored routine for emitting light and/or for the immediate, particularly instant, use of the parameters of light.

If the capacities of the radio network used are limited to the effect that transfer, particularly simultaneous transfer, of the temporal sequence and/or the routine cannot be guaranteed due to the limited capacity, since a significantly larger network capacity is required for transferring such routines and/or sequences compared to the transfer of a start instruction, particularly a start code, it is of particular advantage if the routine for emitting light and/or the parameter of the light is stored on the portable personal devices, particularly well before they are used, for example at least 30 seconds before they are used, and/or transferred and/or sent to the portable personal devices by setting up the portable personal devices on the radio network, particularly through the control system, and/or was stored even before logging into the radio network by means of the app, particularly the app stored on the smartphone and/or by means of the web application on the portable personal devices, particularly by downloading from the Internet, control system and/or radio network. Subsequently, the stored routine for emitting light can, then be started and/or executed by the start instruction, and/or the saved parameter of the light can be used. Here, too, the time at which the start instruction is transferred can be adapted, particularly, to the latency in the radio network; i.e. the start instruction can be transferred at least 100 ms before the desired time. A start instruction that defines a point in time as the start of emitting light as information relative to a timer can usefully also be sent as a repetition after the point in time defined therein. This makes it possible, for example, for portable devices which have missed the one or more transfer(s) before the point in time, to execute the routine to be started partially but completely in sync by calculating upon receiving the start instruction which part of the routine it should now begin with to implement it synchronously.

It is also possible to intervene in a routine already started by means of a change instruction sent by the control system and particularly transferred to the portable devices in the form of a third piece of information, which particularly defines at least one point in time, immediately or in the future, and to modify this by further instructions. Routines and/or sequences particularly can have loops that lead to repeating a sequence several times or indefinitely, provided that the loop is not interrupted, and the further part of the routine and/or sequence can only be executed after exiting the loop. The routine can also be designed in such a way that the execution of the routine is completely stopped for a specified number of repetitions of the loop (also number of abortions), but the routine continues to be executed upon receipt of a change instruction to exit the loop before the specified number of abortions is reached. In this way, the routine can be adapted, for example, to performance parts, for example solos, which are not precisely determined in advance.

The instructions or the first and/or second information can also be implemented by transferring the data for display on a website, particularly if the website is structured in such a way that the display changes over time. For example, the web page can display a colored area, its colors, and/or brightness being changed over time by transferring respective data to the display of the web page. This makes implementation particularly easy, in that the devices only retrieve and display a web page and thereby receive the information for display, and particularly no dedicated software is required on the devices. Groups and/or subgroups can then be implemented for different web pages and/or URLs that are invoked. The information about which web page is to be accessed by the respective device can be encoded on an admission ticket, for example and/or be determined by a location number and entered manually into the device and/or can be read from this.

Furthermore, a loop counter can also be provided which shows the repetitions of the routines and/or processes recorded and/or compares these with a maximum value for the number of repetitions. If the number of repetitions subsequently reaches the maximum value, the loop, particularly the repetition of the routine and/or of the process, can be terminated. This is used particularly to safely terminate the loop in the event that the instruction to terminate the loop was not received and/or not sent and/or not transferred. Another example can be adjusting a routine and/or a process for emitting light to a time profile of the audio-visual performance that deviates from the original planning, for example through flexible, unplanned and/or spontaneous interaction of a musician with the audience within the event area or during a solo or the like.

Particularly, the control system initializes and/or starts transferring the first and/or the second piece of information at least 100 ms, particularly at least 500 ms, before the point in time defined by the start instruction and/or begins with such a lead time that, if the process runs smoothly, the completion of the transfer of the first and/or the second piece of information can be expected at least 100 ms, particularly at least 500 ms, before the point in time defined by the start instruction. The lead time is in this respect given by the duration and/or the time interval which passes between sending and/or transferring the first and/or second piece of information by the control system and receiving and/or processing the first and/or second piece of information at one of and/or the plurality of portable personal devices. In this respect, the lead time includes the duration of information transfer and/or processing. In this respect, the latencies that occur during signal transfer in radio networks can be taken into account when determining the lead time. It is particularly advantageous that the lead time is chosen so that it multiple transferring and/or sending the start instruction, particularly before the defined start time, is possible and particularly is also carried out, for example multiple times for all devices or multiple times in the sense that successive transfers to different devices and/or groups of devices are carried out. Multiple sending, especially before the defined start time, to the same devices offers the advantage of ensuring that the start instruction is transferred to as many portable personal devices as possible. This is particularly important if the number of portable personal devices is so high and/or the start instruction(s) are so complex that the network capacity is insufficient for allowing simultaneous transfer and/or simultaneous sending of the instruction(s) to all portable personal devices during a single sending and/or transfer process and/or the radio link is so unreliable that simple sending cannot ensure a transfer to all or at least to a sufficient number, particularly to more than 70% of the plurality of devices. If therefore the transfer and/or sending the start instruction is started early, it allows sufficient lead time for multiple transfers and/or multiple sending. Particularly, the portable personal devices can request the instructions by communicating with the control unit and/or communicate and/or confirm the receipt of the instruction to the control system. A request for the instruction by the personal portable device can particularly be provided if the device did not receive a new, repeated, and/or confirmatory instruction in a defined time interval, for example as early as during the execution of a routine and/or a sequence for emitting light, if the portable personal device did not receive an instruction in a defined time interval with respect to the termination of the routine and/or of the sequence specifying if the routine and/or the sequence should be repeated and/or restarted and/or another routine and/or sequence is to be started. If, for example, a start instruction for the emission of light using a previously stored parameter of the light and an instruction for the termination of the emission of light is provided, the portable personal devices can request an instruction by communicating with the control system, if no instruction to terminate and/or to change the parameter of the light and/or confirmation has been received within a predefined time interval. The two above examples can also be combined with one another; particularly, the embodiments are not limited to these examples.

In a particularly advantageous further development of the method, the plurality of portable personal devices are divided into N groups. N is at least two, and each of the N groups specifically includes at least fifty portable personal devices.

Advantageously, the division into N groups is based on the position of the portable personal devices within the event site. The position of the portable personal devices is particularly determined by i. a seat and/or a seat designation, wherein particularly a code is used for detecting and/or assigning the seat and/or the seat designation a code, wherein the code is particularly a barcode, QR code, and/or RFID tag attached to an admission ticket and/or, particularly directly, on or to the seat, and/or
  ii. triangulation and/or distance measurement between the portable personal devices and at least two, particularly stationary, base stations and/or radio antennas within the event site, and/or
  iii. satellites and/or beacon-based location, e.g. GPS, and/or
  iv. detecting access points, particularly radio antennas, at which the portable personal devices receive access to the radio network and/or dial into the radio network and/or log in, and/or
  v. determining respective neighboring radio network subscribers, particularly portable personal devices, particularly by the portable personal devices, for example by means of near-field communication and/or radio communication, for example using Bluetooth and/or distance measurement between the portable devices and/or based on photos from cameras of the portable devices.

A first number of portable personal devices that are neighboring, particularly do not exceed a maximum distance from a spatial focus and/or center of a group, insofar as neighboring personal devices are not only the devices that are physically closest to each other but all portable personal devices within the distance around the focus and/or center, and/or the positions of which are in a first geographical zone, particularly, for example, within a delimited seating block, within the event site and/or which get access to the radio network via a first base station and/or radio antenna and/or dial and/or log into the radio network is assigned to a first group of the N groups. A second number of portable personal devices that are neighboring and/or the positions of which are in a second geographical zone within the event site, and/or which get access to the radio network via a second base station and/or radio antenna and/or dial and/or log into the radio network is assigned to a second group of the N groups. This can be continued accordingly, particularly for the other of the N groups.

It is particularly advantageous to synchronize and/or configure the emission of light by the portable personal devices within at least one, particularly several, particularly each of the N groups, particularly in a way that differs from portable personal devices within other groups of the N groups, wherein the emission of light by a first group of the N groups is different with respect to timing, particularly based on a starting time for the emission of light and/or the sequence and/or with respect to at least one parameter of the light (particularly color and/or intensity) from the emission of light by at least one second group of the N groups.

In addition, X subgroups can advantageously be defined within the N groups and/or within the plurality of portable personal devices. For assigning the portable personal devices within one of the N groups and/or the plurality of the portable personal devices to one of the X subgroups, the location of the portable personal devices within the group and/or of the plurality of portable personal devices, particularly relative to one another, is analyzed, particularly with regard to their order, proximity and/or spatial distribution within one of the N groups and/or the plurality of the portable personal devices, particularly analogous to one or more of the methods i to v for assigning the personal portable devices to the N groups, or by means of light identification codes sent by the portable devices (for example, light and/or flashing patterns that are detected by means of at least one camera connected to the control system). Particularly, at least one group of the plurality of portable devices is defined, which is then instructed to output an identification code by means of a light source, particularly a display. If the identification code is detected by means of at least one camera of the control system and the position of the portable device is determined as described above or by means of the at least one camera, the position of individual portable devices can be determined and differentiated light patterns can thereby be generated.

Assignment to the X subgroups is particularly performed alternately, in segments, and/or in a pattern, particularly a structured pattern. This assignment to subgroups enables the creation of various structured images and/or visual effects by means of the emission of light. For example, a type of waveform movement of the light can be generated, particularly within a group, by assignment to segments and time-shifted emission of light. It is also conceivable that such a waveform movement continues into another group, particularly also in temporal succession, such that the last subgroup or the last segment of a first group, particularly the spatially adjacent segment of a next group, follows in time. The assignment to subgroups that follows a more complex or structured pattern can, for example, make it possible to display a logo of a musician or band or the like by means of light emission. In this case, only the plurality of portable personal devices and the capacity of the control unit indicating how much information or start instructions can be sent, particularly in a given period of time and/or the network capacity of the radio network and the limits of positioning are limiting factors. The possibility of assigning groups and subgroups accordingly creates maximum flexibility, unless limited by the limits described a above, with regard to a design and/or planning of spatially distributed, synchronous emission of light and/or the routines for emitting light by the portable personal devices, such that emission of light individually adjusted to the event venue and/or the number of portable personal devices and/or particularly the audio-visual performance itself is made possible.

Particularly, the assignment of the plurality of portable personal devices to the N groups and/or X subgroups can advantageously be checked to the effect that the portable personal devices receive a control instruction for the emission of light, wherein the emission of light initiated by the control instruction being is detected by means of the camera of the control system and then analyzed and, particularly, compared to the emission of light requested by the control instruction. This control instruction is preferably an instruction for the emission of light in a control pattern, particularly an emission of light separated in time between the individual groups and/or subgroups. The separate emission of light can preferably also contain a code, particularly for example a Morse code. Also any incorrect assignments of portable personal devices to one of the N groups and/or X subgroups using other methods can be detected and/or corrected.

Advantageously, the control system, particularly the sequencer, controls and/or causes a synchronization between the light emission of the portable personal devices and the audio-visual performance, wherein the synchronous distributed emission of light is synchronized with the delivery of at least one audio output, particularly click track, particularly on the event site, particularly on the stage, and/or at least one emission of light by a plurality, particularly stationary, light emission devices on the event site, particularly on the stage, that is, time-wise parallel or synchronously controlled with respect to the audio output and/or the emission of light by the plurality of light emission devices on the event site, particularly on the stage, wherein the emission and/or delivery is performed particularly by the control system. Synchronization of the synchronous distributed emission of light to the delivery of the at least one audio output, particularly click track, and/or the at least one emission of light by the plurality of, particularly stationary, light emission devices on the event site, particularly on the stage, allows linking a the stage and the audience with one another in terms of the audiovisual design of the events. For example, it would be conceivable to record the rhythm and/or the beat of the audio output and control the emission of synchronous, distributed light within the event area synchronized with this rhythm and/or beat. Above all, this enables a viewer to be strongly involved in the audiovisual performance.

Particularly advantageously, the control system controls and/or causes a synchronization between the emission of light of the portable personal devices and the audio-visual performance, this being achieved in that the synchronous distributed emission of light is synchronized with the delivery of at least one instruction. This is done particularly in that the first and/or second information are made and/or sent such that they cause synchronization with the instruction. Particularly, the at least one instruction is sent to at least one musician by means of a display and/or a headphone, wherein the at least one instruction is particularly a song text, grip pattern, movement instruction and/or a time and/or notes and/or chords and/or a text instruction and/or a playback and/or a counter, particularly an optical counter. Particularly, the first and/or second piece of information is configured such that it includes a start instruction that leads to the instruction of synchronized emission of light, particularly such that an emphasis required by the instruction occurs at the same time as an increase in the intensity of the emission of light and/or a change in color of the emission of light. Particularly, the instruction for generating the instructions is stored with a reference to a sequence of light emission, particularly in a data record, and is used to determine in advance when and in what form a first and/or second piece of information is to be sent in order to achieve an emission of light synchronized in time with the output of the instruction. Particularly, the control system is adapted to determine this and to generate first and/or second pieces of information. Particularly, the control system or the method is configured to receive a start instruction at the control system at the beginning of the output of instructions and then to start issuing the instructions based on the data record, and to generate and send first and/or second pieces of information based on the reference. A preparation phase can also be carried out, the method being set up particularly to receive an instruction at the beginning of this preparation phase, wherein in this preparation phase first and/or second pieces of information, especially routines and/or sequences of the emission of light are proactively generated and sent, particularly transferred, and to which the system will resort after the control instruction by means of first and/or third pieces of information, particularly start and/or change instructions.

The control system can particularly advantageously be connected to a module for generating at least one time marker and/or communicate with and/or include such module, wherein the module is adapted to record and/or analyze the audio output by means of the module. By recording and/or analyzing the audio output, the at least one time marker is generated and then transferred to the control system. The control system is advantageously adapted to generate and send, particularly to transfer the at least one first and/or second piece of information based on the at least one time marker. The audio output can be recorded and/or analyzed either by manual input or automatically. One option of manually entering the time marker can be in that the module is operated by a person, for example, in such a way that the beat played and heard by the person is tapped on it. The module can also be connected directly to a musician's instrument and/or record and/or process its sounds, preferably with a drum kit. The module can have a user interface, for example by means of a tablet or another smart device with a touchscreen or similar, which is adapted to receive a manual input, so that, for example, by repeated manual input on the user interface, for example by repeatedly tapping the touchscreen, the rhythm can be recorded manually. Alternatively, the module can have an analyzer that monitors the audio output for rhythm or the like, and the time marker is generated based on this analysis.

In another advantageous embodiment of the method, setting up includes integration into the radio network, assignment of a, particularly, unique, identification in the radio network, assignment of a, particularly, unique, address in the radio network and/or announcing at least one server address of the control system to each of the portable personal devices and/or the instruction to perform synchronization, particularly with a time server, particularly localized on the event site, particularly by means of ntp, and repeating it, particularly at defined time intervals and/or time windows.

In another advantageous embodiment, the method includes an adjustment, particularly the synchronization of at least one clock generator, particularly a clock, of the control system with at least one clock generator, particularly a clock, in each of the portable personal devices, particularly as part of the setup and/or before the time defined by the start instruction and/or that the method performs the adjustment, particularly the synchronization of at least one clock, particularly clock, of the control system with the time of at least one public cellular network that can be received on the event site. As a result of the adjustment, the portable personal devices receive a defined reference time from the clock generator, particularly the clock, of the control system, based on which, and thus in a temporal relation therewith, the transferred times are selected and/adjusted. This means that a temporal relation, for example a difference, between the clock generators can be determined so that this temporal relation is subsequently included in the transferred times, particularly the start instructions, which contain a defined point in time, and the transferred times can be adjusted with respect to this time difference.

The adjustment, particularly the synchronization, is advantageously repeated several times and/or first and second pieces of information are repeatedly transferred to each of the portable personal devices in a chronological sequence, whereby a new point in time is defined in each case by the start instruction.

In a further advantageous embodiment of the method according to the invention, the routine, sequence, and/or process are stored together with audio signals, particularly click track, and/or information about their generation is stored. Advantageously, for performing the method at least one routine, sequence, and/or a sequence and/or audio signals and/or pieces of information about their generation are loaded from the Internet, a data memory and/or using a data connection into the and/or by the control system, wherein this process is independent of the radio network and/or the portable personal devices. This allows central control of the entire audio-visual performance by means of the control system, particularly by means of the sequencer. The stored sequencer file allows the audio-visual performance to be planned in advance as a whole, depending on the configuration of the file, particularly in advance of the audio-visual performance, or alternatively, to include a kind of kit with control elements for controlling the audio-visual performance in the sequencer file, such that the audio-visual performance can then be designed with recourse to these elements during its implementation, especially in the case of a live performance, e.g. by sound and/or light technicians within the event area. Particularly, the audio-visual performance in the case of such a live design can then be amended based on changing circumstances and/or requirements within the event site and/or of the audio-visual performance. For example, during a solo or the like of a musician on stage, it is possible to adapt the rest of the audio-visual performance to the length of the solo, since the length of such solos usually varies greatly, especially solos by the same musician, especially in different live performances. Alternatively, only control instructions which include direct activation commands or instructions for the immediate triggering of a routine, sequence, and/or process, can be loaded into the control system and stored therein. Particularly, the routines, sequences, and/or processes to be triggered are then stored on the portable personal devices and/or are loaded from the Internet, from a data memory, and/or by means of a data connection into the portable personal devices for performing the method.

The problem is also solved by a computer-readable memory of a hardware and software system on which computer-readable instructions are stored which, when executed by a processor unit of the hardware and software system, enable the processor to perform, the method according to the invention. Both a control system according to the invention and the portable personal devices, particularly smartphones, can be selected as hardware and software systems. Depending on the task the hardware and software system is to perform, the instructions stored in the computer-readable memory can be adapted to the respective tasks.

The problem is also solved by a control system adapted to perform the method according to the invention. The control system according to the invention comprises at least one processor unit, a memory, particularly a computer-readable memory according to the invention, a timer, and at least one radio communication means.

The control system is connected to the radio network by means of the at least one radio communication means, such that communication between other network subscribers, particularly the plurality of portable personal devices, and the control system is made possible via the radio network. The at least one radio communication means is also adapted to transfer and/or to send data via the radio network from the control system to other network subscribers as well as data transferred by the radio network from the other network subscribers to the control system, such as particularly identification codes and/or numbers, especially a network address, and/or to receive location data of the portable personal devices and particularly to forward them to the processor unit.

The processor unit is adapted to perform the method according to the invention. For this purpose, execution instructions for performing the method according to the invention are stored in the memory. The processor also has access to the execution instructions which enable the processor unit to perform the method according to the invention. Furthermore, the processor unit can be adapted to analyze data transferred by the other network subscribers to the control system, particularly location data, particularly to use the data to assign the portable personal devices to groups and/or subgroups, and to store the transferred data and/or results of the data analysis transferred, particularly the groups and/or subgroups assigned to the portable personal devices, in the memory, particularly for further use in the method according to the invention. Particularly, the processor unit can also be adapted to transfer and/or send and/or transmit the results of the data analysis, particularly the groups and/or subgroups assigned to the portable personal devices, to the network subscribers, particularly the portable personal devices, by means of the at least one radio communication means.

Furthermore, first and/or second pieces of information, routines, and/or processes for the emission of light can be deposited and/or stored in the memory. The processor unit is adapted to select first and/or second pieces of information, routines and/or processes based on the transferred data and/or results of the data analysis for the respective network subscribers, particularly respective portable personal devices, particularly depending on the assignment to groups and/or subgroups, and to send the selected first and/or second pieces of information, routines and/or processes to the respective network subscribers, particularly the respective portable personal devices.

By means of the timer, the control system can be synchronized in time with the other network subscribers, particularly the portable personal devices. For this purpose, the time of the timer can be transferred to the other network subscribers, for example by means of the radio network, and/or the time of the timers of the respective network subscribers is transferred and/or sent from the network subscribers to the control system and/or be requested by the control system, particularly to determine time differences between the timers, wherein the determined time differences can be stored, particularly in the memory, particularly assigned to the respective network subscribers. Furthermore, the latency within the radio communication between the control system and network subscribers can be determined by measuring the runtime. The timers can also be synchronized using ntp (network time protocol) or the like.

Particularly, the processor unit can be set up, according to the invention, to take the determined time differences and/or latencies into account during sending and/or transfer of the first and/or second piece of information, routine and/or sequence for emitting light by means of the at least one radio communication means via the radio network to the other network subscribers such that the first and/or second piece of information, routine, and/or process for emitting light is simultaneously received and/or processed and/or converted into a synchronous emission of light by the network subscribers, particularly by the portable personal devices, by at least one part, particularly a group and/or subgroup, of the network subscribers, particularly by the portable personal devices. Particularly, the first piece of information sent to the respective group and/or subgroup and/or the respective network subscriber, particularly the respective portable personal device, can be amended by the processor unit, particularly taking into account the time difference between the timer of the control system and the respective network subscriber and/or the latency within the communication of the control system and the respective network subscriber via the radio network.

The control system according to the invention can furthermore be connected to, or include, a sequencer.

In addition, the problem is also solved by portable personal devices having a processor unit, a memory, particularly a computer-readable memory according to the invention, as well as at least one radio communication means and at least one light source, particularly a display.

The portable personal devices are connected to the radio network by means of the at least one radio communication means, such that the portable personal devices and the control system according to the invention are enabled via the radio network. The at least one radio communication means is also adapted to download data from the control system via the radio network and/or from a server, particularly an Internet server, wherein the server can particularly also be the control system according to the invention and/or can be part of the control system, and particularly to store this data in the memory. The received and/or downloaded data can particularly include computer-readable instructions which, when executed by a processor unit of the hardware and software system, enable the processor to carry out the method according to the invention, and/or include first and/or second pieces of information, routines and/or processes for emitting light, wherein the processor unit implements first and/or second pieces of information, routines and/or processes for emitting light into light emission by means of the at least one light source.

Furthermore, the at least one radio communication means is also adapted to transfer data, such as, particularly, identification codes and/or numbers, especially a network address, and/or to send and/or to submit location data of the portable personal devices to the control system according to the invention.

Furthermore, particularly a timer can be provided. The timer is adapted to communicate with the processor and/or the radio communication means. The timer of the portable personal device can be synchronized with the timer of the control system using the radio communication means. For this purpose, the value of the timer of the portable personal devices can be transferred to the control system, and the adjustment is made by the control system, or the control system sends the value of its timer to the portable personal device, and the device makes the adjustment. If the value of the timer of the control system or a time difference between the timers determined by the control system is sent by the control system to the portable personal devices and received by the portable personal devices, said difference can particularly be stored in the memory. The timer of the portable personal device can subsequently be adapted to the timer of the control system by means of the processor unit, and/or the time difference can be taken into account by the processor unit in the implementation of received information, routines, and/or processes for emitting light.

The problem according to the invention is also solved by a software product, wherein the software product for performing the method according to the invention is stored in a memory, particularly a computer-readable memory according to the invention, of a hardware and software system, particularly a control system according to the invention and/or a portable personal device according to the invention, loaded from the memory, and executed by means of a processor unit.

BRIEF DESCRIPTION OF THE SEVERAL VIEWS OF THE DRAWINGS

FIGS. 1 to 7 are intended to further illustrate the method according to the invention and show various embodiments and/or partial aspects of the method according to the invention. The individual figures are not alone standalone; instead, these or the advantages disclosed therein can be combined with one another, particularly the method according to the invention is not limited thereto. Wherein:

FIG. 1 shows an embodiment of a routine within the method according to the invention, FIG. 2 shows a diagram containing the synchronize ion between the control system and the portable personal devices, FIG. 3 shows a concept for determining the latency within the communication between the control system and portable personal devices, FIG. 4 shows a concept for converting a routine into execution instructions specific to a portable personal device for playback of the routine by the portable personal device, FIG. 5 shows a time profile of an embodiment of the method according to the invention, FIG. 6 shows another time profile of an embodiment of the method according to the invention, and FIG. 7 shows a concept for dividing portable personal devices into groups and subgroups.

DETAILED DESCRIPTION

Figure 1:
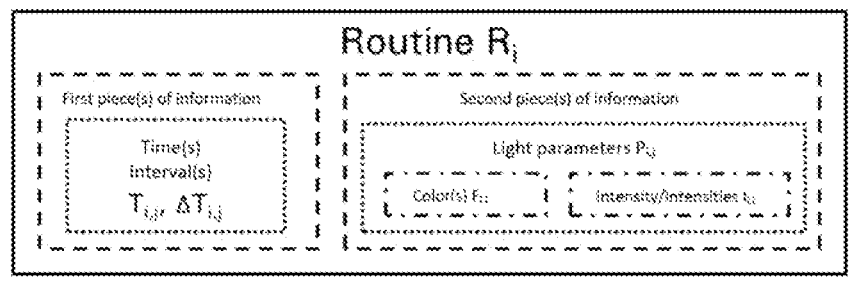

FIG. 1 shows a potential embodiment of a routine $R_i$ according to the invention. The routine $R_i$ is composed here of first and second pieces of information. Usually, at least one second piece of information is also provided for each first piece of information. The first piece of information includes times $T_{i,j}$ and/or time intervals $\Delta T_{i,j}$. The second piece of information includes the parameters $P_{i,j}$ of the light to be emitted, which are derived from the colors(s) of the light to be emitted $F_{i,j}$ and their intensities $I_{i,j}$. At least one parameter of the light $P_{i,j}$ can be assigned to each time information $T_{i,j}$. Particularly, the color $F_{i,j}$ and/or the intensity $I_{i,j}$ of the light can assume the value "zero". Such "zero" information is used to end the light emission. A time interval $\Delta T_{i,j}$ can be inherently defined by the difference between two points in time $T_{i,j}$ or it can define the point in time of "zero" information via an explicitly defined interval duration.

Figure 2:
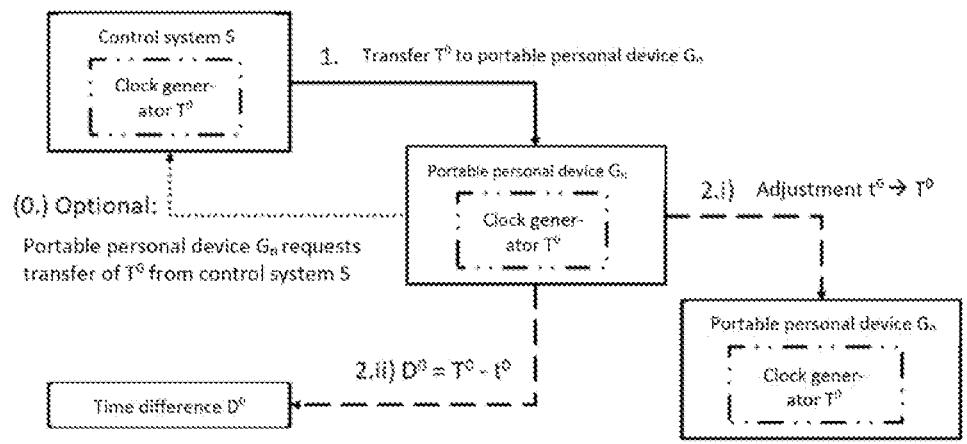

FIG. 2 includes the synchronization between a control system S, having a clock generator with a time $T^o$, and a portable personal device $G_n$, having a clock generator with a time $t^o$. $T^o$ and $t^o$ are set in relation to one another and/or adjusted. In a first step 1), the control system S transfers $T^o$ to the device $G_n$. This transfer can optionally be initiated by a request from the device $G_n$ to the control system S. Particularly, this request can be part of setting up the portable personal devices via the radio network. The second step involves the adaptation of the clock generators to one another or their synchronization. In a first alternative 2.$i$), the value $T^o$ of the timer of the control system is taken over by the device $G_n$, such that its timer also subsequently has the value $T^o$. Alternatively (step 2.$ii$) a time difference $D^o$ can be determined between the value of the clock generator of the control system S and that of the clock generator of the device $G_n$. Subsequently, $D^o$ can then be used to convert or translate the time values of the control system $T_{i,j}$ into $G_n$-specific time values $t_{i,j}$.

Figure 3:
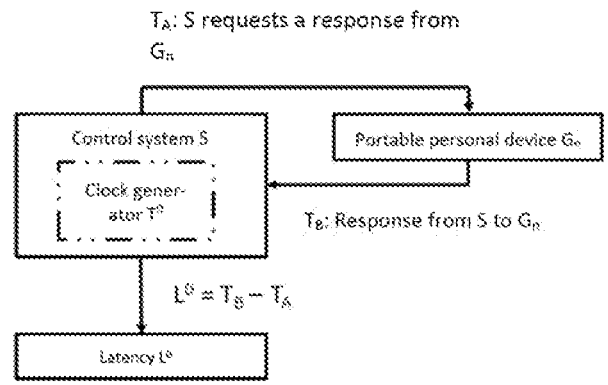

FIG. 3 conceptually illustrates the determination of an upper limit for the latency $L^o$ within the radio communication between the control system S and a portable personal device $G_n$. To this end, the control system S sends a request to send a response to the device $G_n$ at a point in time $T_A$. The device $G_n$ then sends a response which can contain the time $T_B$. $T_B$ can either be the time of receiving the request or, alternatively, the time of sending the response. Alternatively, $T_B$ can be determined from the point in time when the response from the device $G_n$ was received at the control system S. The upper limit of the latency $L^o$ results from the difference between $T_B$ and $T_A$. $T_B$ is advantageously the time at which the response is sent, such that not only the transfer time of the sent data but also their processing by the device $G_n$ is taken into account for the latency.

Figure 4:
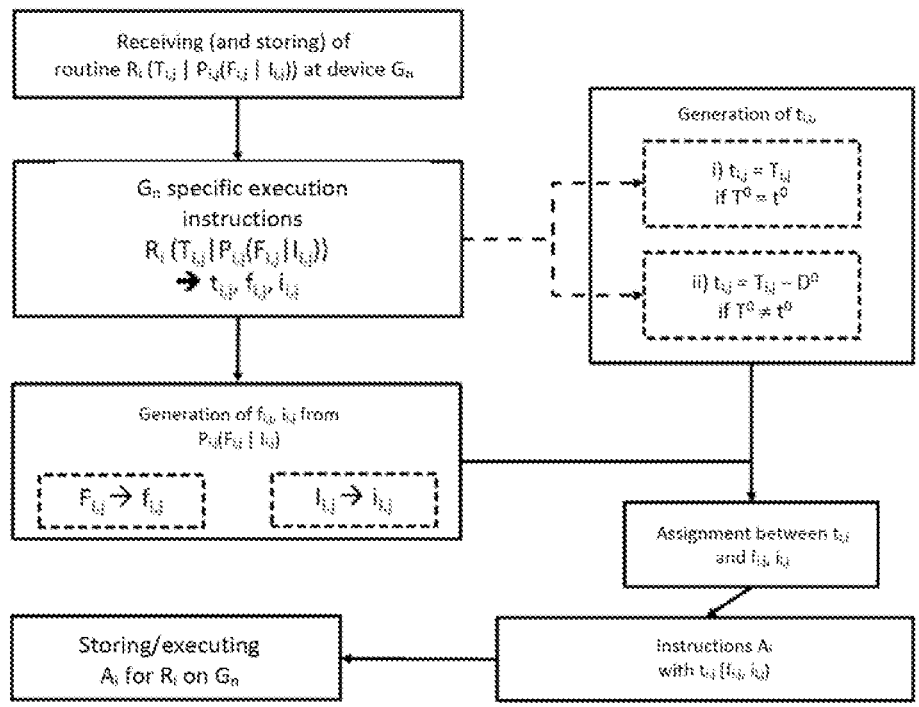

FIG. 4 illustrates the implementation of a routine $R_i$ by a device $G_n$. In a first step, the routine $R_i$ is received by the device $G_n$ and optionally stored on it. The routine $R_i$ contains the times $T_{i,j}$ as well as parameters of the light $P_{i,j}$ assigned to these times $T_{i,j}$, which include the colors $F_{i,j}$ and their intensities $I_{i,j}$. $T_{i,j}$ and $P_{i,j}$ including $F_{i,j}$ and $I_{i,j}$ are subsequently converted into execution instructions $t_{i,j}$, $f_{i,j}$, $i_{i,j}$ specific to the device $G_n$. There are two alternatives for determining the $t_{i,j}$ which depend on the previous synchronization between S and $G_n$. If $T^o$ has been adopted by Gn as the time value of the clock generator, the $t_{i,j}$ correspond to the received $T_{i,j}$. Otherwise the $t_{i,j}$ are obtained by adjusting the $T_{i,j}$ by $D^o$. $f_{i,j}$ are generated directly from the $F_{i,j}$ and $i_{i,j}$ from the $I_{i,j}$, and are therefore transcriptions of the transferred $F_{i,j}$ and $I_{i,j}$. The $t_{i,j}$ and the $f_{i,j}$ and $i_{i,j}$ are then assigned to one another according to their indices. This results in execution instructions $A_i$ which can be understood as a transcription of the routine $R_i$ specifically for the device $G_n$. The $A_i$ can then be carried out immediately and/or be saved on the device $G_n$ for later execution.

Figure 5:
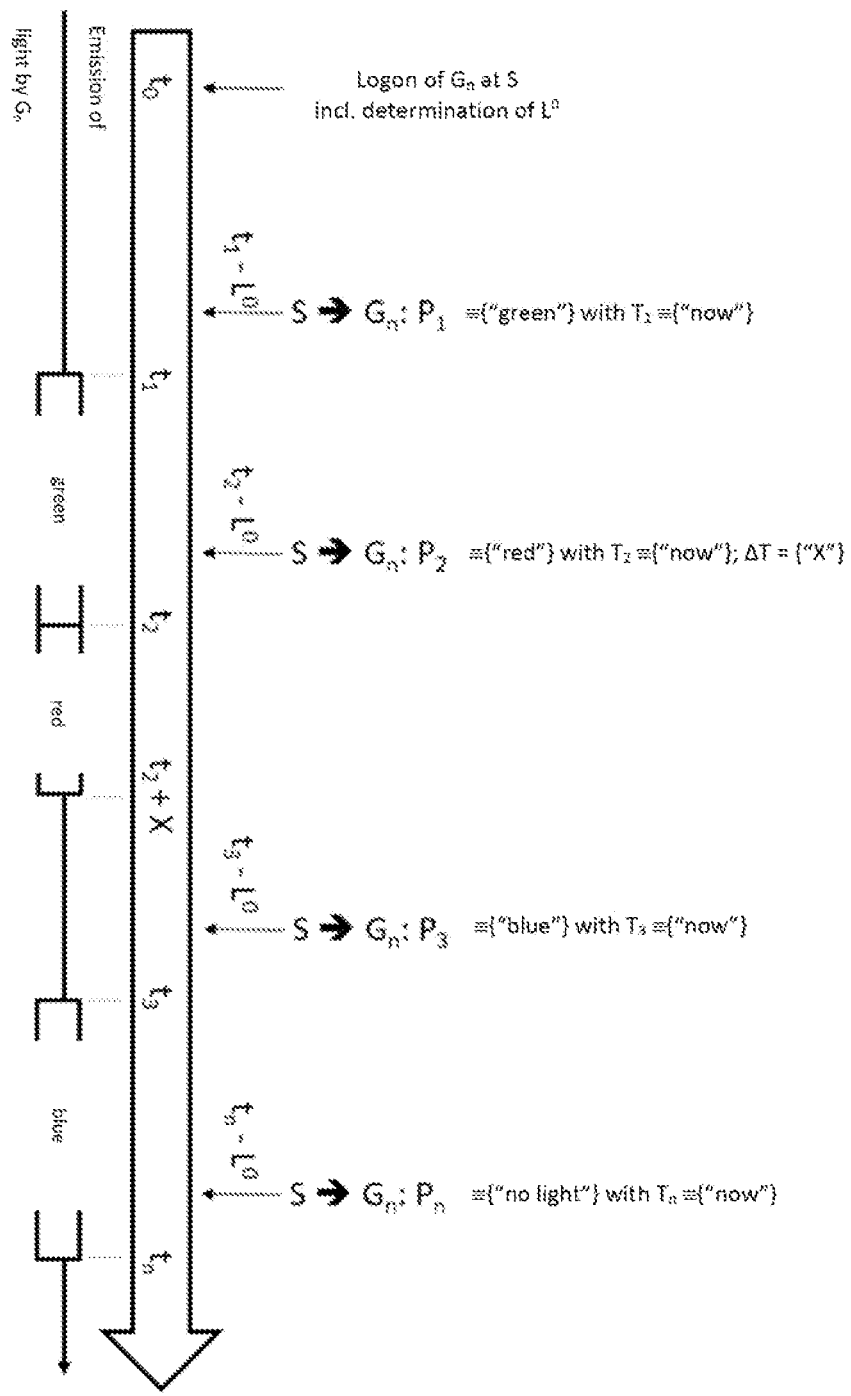

FIG. 5 illustrates the course of the method according to the invention over time within an advantageous embodiment. In this case, usually, no, particularly no complete, routine is transferred to the device $G_n$. Instead, the control system S transfers the instructions with the aim of an instant, direct implementation by the device $G_n$. At a time $t_0$, the device Gn is first registered with the control system S. In the further course of the method according to the invention, the latency $L^o$ within the radio communication is advantageously taken into account, which is advantageously determined at least during the registration of the device $G_n$ with the control system S. If now at time, $t_1$, an emission of light with a parameter $P_1$ is to be carried out, the control system S sends the instruction for this purpose at the time $t_1-L^0$, wherein $L^0$ particularly includes only the time of transfer to the device and the processing before light emission. The instruction contains $P_1$. In FIG. 5, $P_1$ includes that light of the color "green" is to be emitted. $T_1$ contains the information "now" or "immediately", that is not an explicitly mentioned time, but instead gives $G_n$ the instruction to implement $P_1$ without delay. Since no time interval, in this regard, the duration of the light emission, has been defined, light of the color "green" is emitted until $G_n$ receives another instruction and particularly also implements it. In FIG. 5, S sends a new instruction containing $P_2$ with the content "red", $T_2$ with the content "now", and a time interval $\Delta T$ with the value "X" at time $t_2-L^0$. In this respect, the color of the emitted light changes from "green" to "red" at time $t_2$. Since a time interval $\Delta T$ with the value "X" was transferred, $G_n$ ends the emission of light at time $t_2+X$. At time $t_3-L^0$, S sends another instruction to $G_n$, which contains the parameters $P_3$ ("blue") and $T_3$ ("now"). At time $t_3$, a renewed emission of light begins, here in the color "blue", by the device $G_n$. The emission of light by $G_n$ can be ended with the aid of a last instruction at time $T_n-L^0$. For this purpose, the instruction contains the time $T_n$ ("now") and the parameter $P_n$ ("no light"). The emission of light by Gn is then ended at time $t_n$. This schematic example can in principle be supplemented by any number of further instructions from the control system S to the device $G_n$.

Figure 6:
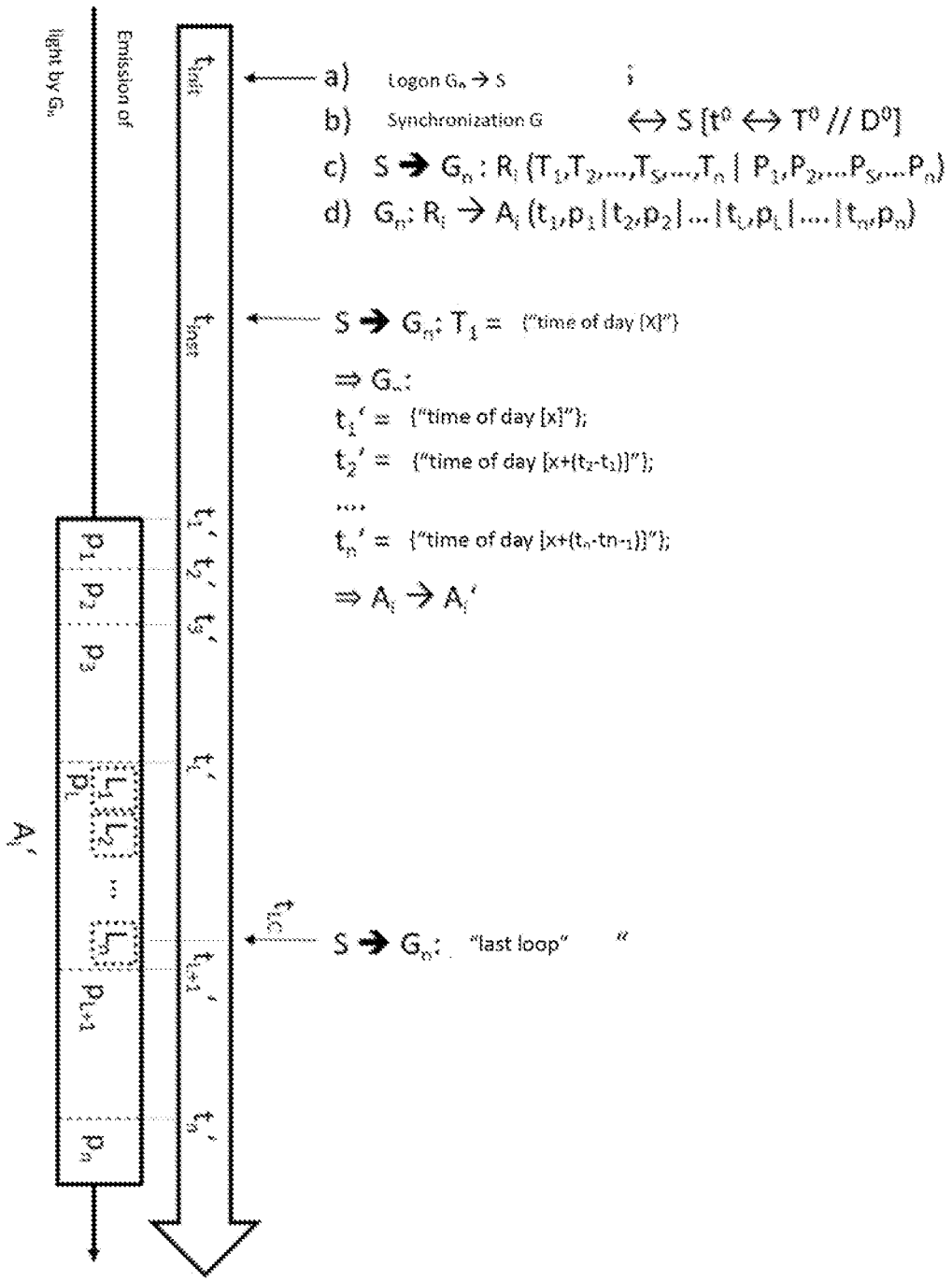

FIG. 6 shows the course of the method according to the invention over time in a further advantageous embodiment.

At a time to $t_{init}$, the devices Gn are initially initialized or set up for carrying out the method according to the invention. The device $G_n$ logs on to the control system S during initialization or setup. In a second step, $G_n$ and S are synchronized during the initialization process, particularly as shown in FIG. 2. As a result, the control system S sends the routine $R_i$ to the device $G_n$. This is followed by the conversion of the routine $R_i$ into the execution instructions $A_i$, which are stored on the device $G_n$ for later execution of the routine $R_i$, thereby completing initialization. The times $t_i$ are not explicitly defined, particularly in the sense of a time of day, but only the individual $t_i$ are set in a time relation to one another.

At the time $t_{inst}$, the control system S sends a start instruction to the device $G_n$. This start instruction includes an explicit value, particularly a defined time of day, for time $T_1$, thus also for $t_1$. This is followed by a conversion of the times $t_i$ to the times $t^{i\prime}$, which then contain an explicit time specification, particularly a defined time of day. Similarly, $A_i$ is adjusted to the specified times $t_i'$, such that $A_i'$ is obtained. In the example shown in FIG. 6, times marked with "'" always have a defined time related to the start instruction of the control system S.

At the time $t_1'$, the device Gn subsequently starts the routine stored in the execution instructions $A_i'$. Here, the parameter $p_i$ of the light, particularly to the routine, is adapted to the predefined times $t_2'$, $t_3'$, etc. The routine contained in FIG. 6 also has a loop, which can particularly contain a subroutine. In the example shown, while loading the routine, the device $G_n$ was not given any information about the number of iterations of the loop after which the execution of the loop should be ended. The device $G_n$ therefore requires a further instruction from the control system S as to the time at which the loop is to be exited or terminated. In FIG. 6, a loop is triggered at time $t_L'$. This is run through several times. During the n-th repetition of the loop $L_n$, the control system S sends a "last loop" instruction to the device $G_n$ at time $T_{LC}$, and Gn accordingly transfers the information that the loop $L_n$ should be the last repetition. At time $t_{L+1}'$, the loop is therefore exited, and the routine continued. Such an option of reproducing parts of a routine and/or sub-routine multiple times in loops makes it possible to adjust the routine to the length of a solo performance by a musician, for example, which usually vary greatly in length.

Figure 7:
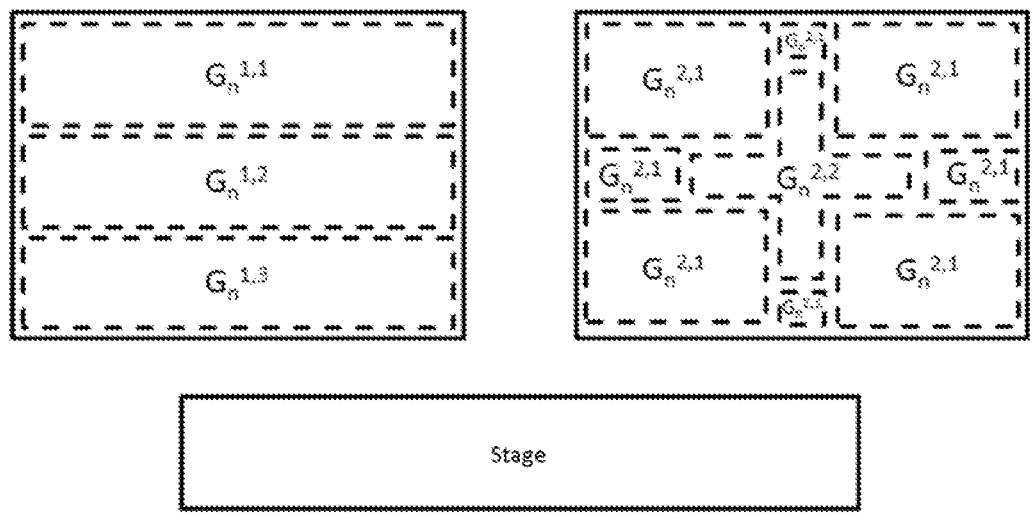

FIG. 7 illustrates the option of dividing the devices Gn into groups and/or subgroups. The devices are given the designation $G_n^{X,\ Y}$, where X indicates the group and Y the subgroup. In the example shown, the audience in front of the stage was assigned to two groups. Group 1 should reproduce, for example, the flag of the Netherlands as a pattern. 3 subgroups are required for this. Devices assigned $G_n^{1,1}$ get the instruction "red", $G_n^{1,2}$ "white", and $G_n^{1,3}$ get "blue". Group 2, on the other hand, should reflect the flag of Switzerland. Two subgroups, $G_n^{2,1}$ and $G_n^{2,2}$ are needed, wherein $G_n^{2,1}$ gets the instruction "red" and $G_n^{2,2}$ gets the instruction "white".

The patterns that can be displayed are b no means limited to flags; instead, much more complex patterns can be formed, such a logos of music bands or the like.

The invention claimed is:

1. A method for controlling a synchronous, distributed emission of light within an event site during an audio-visual performance, by means of a control system, wherein the method comprises:
   emitting the synchronous, distributed light by a plurality of portable personal devices each including at least one light source;
   configuring the control system to control or to synchronize the emission of light by the plurality of portable personal devices;
   adapting the control system to communicate with the plurality of portable personal devices by means of a radio network or via a cellular network or via the Internet;
   setting up the plurality of portable personal devices to receive control instructions from the control system via the radio network, and to implement the control instructions into the synchronous, distributed emission of light;
   wherein the setting up of each of the plurality of portable personal devices is triggered by the respective portable personal device contacting the control system by connecting to the radio network;
   effecting the synchronous, distributed emission of light by the plurality of portable personal devices by transferring at least one first piece of information regarding timing or at least one second piece of information regarding color control of the emission of light from the control system via the radio network to the plurality of portable personal devices.

2. The method according to claim 1, wherein the control system controls or causes a time synchronization between the plurality of portable personal devices and the audio-visual performance, wherein the synchronous, distributed emission of light to be synchronized in time with the delivery of at least one audio output or at least one emission of light by a plurality of light emission devices on the event site wherein the emission or delivery is effected by means of the control system.

3. The method according to claim 2, wherein the control system controls or causes a time synchronization between the plurality of portable personal devices and the audiovisual performance, wherein the synchronous, distributed emission of light is synchronized in time with the delivery of at least one instruction, wherein the at least one instruction is presented to at least one musician by means of a display or a headphone, wherein the at least one instruction is a song text, grip pattern, or time, or notes, or chords, or a text statement, or a playback, or a counter, or an optical counter.

4. The method according to claim 1, wherein the control system is connected to, or communicates with, a module for generating at least one time marker, wherein the module is adapted to record or to analyze the audio output by means of the module, wherein the at least one time marker is generated by capturing or analyzing the audio output, wherein the at least one time marker is transferred to the control system, wherein the control system is adapted to generate and send or transfer the at least one first or a second piece of information based on the at least one time marker.

5. The method according to claim 1, wherein the control system is connected to a radio base station or includes the radio base station, wherein the radio base station is adapted to communicate with the plurality of portable personal devices via the radio network, whereby the control system is adapted to communicate with the plurality of portable personal devices via the radio base station using the radio network.

6. The method according to claim 1, wherein the at least one first piece of information for the timing of the emission of light is a time at which the emission of light starts or for starting a routine for emitting light or the at least one second piece of information includes at least one parameter of the light, wherein the at least one parameter of the light is color or intensity or the at least one first piece of information and the at least one second piece of information together define the temporal sequence of the emission of light, or define a routine for the temporal sequence of the emission of light.

7. The method according to claim 6, wherein the first piece of information, the second piece of information, the temporal sequence, the routine for emitting light or the at least one parameter of the light is transferred from the control system via the radio network to the plurality of portable personal devices and is stored on the plurality of portable personal devices, wherein the first piece of information is a start instruction to the plurality of portable personal devices via the radio network to trigger the stored routine, for emitting light or for using the parameters of the light to emit light, wherein the start instruction is an instruction to emit light or to start the stored routine for emitting light or for using the parameters of the light at a time defined by the start instruction or defined by a time interval.

8. The method according to claim 6, wherein the control system initializes or starts the transfer of the first piece of information or the second piece of information at least 100 ms before the time defined by the start instruction or begins with such a lead time that, if the process runs smoothly, the completion of the transfer of the first piece of information or the second piece of information is expected at least 100 ms before the time defined by the start instruction.

9. The method according to claim 1, wherein the plurality of portable personal devices are divided into N groups, wherein N is at least two.

10. The method according to claim 9, wherein the division into N groups is based on the position of the plurality of portable personal devices within the event site, and wherein the position of the plurality of portable personal devices is determined by:
  i. a seat or a seat designation, wherein a code is used for detecting or assigning the seat or the seat designation, wherein the code is one of a barcode, QR code, and an RFID code attached to an admission ticket or directly on or to the seat, or
  ii. triangulation or distance measurement between the plurality of portable personal devices and at least two base stations or radio antennas within the event site, or
  iii. using GPS, or
  iv. detecting access points at which the plurality of portable personal devices receive access to the radio network or dial into the radio network or log in, or
  v. detecting neighboring radio network subscribers;
  wherein a first number of the plurality of portable personal devices that are adjacent or the positions of which are in a first geographical zone within the event site or which get access to the radio network or dial or log into the radio network via a first base station or radio antenna, are assigned to a first group of the N groups and a second number of the plurality of portable personal devices that are adjacent or the positions of which are in a second geographical zone within the event site, or which get access to the radio network or dial or log into the radio network via a second base station or radio antenna are assigned to a second group of the N groups.

11. The method according to claim 9, wherein the emission of light by plurality of portable personal devices within each of the N groups, deviating from other groups of the N groups, is synchronized, wherein the emission of light by a first group of the N groups differs in time, or with respect to a start time for the emission of light, or with respect to at least one parameter of the light, from the emission of light by at least one second group of the N groups.

12. The method according to claim 9, wherein there are X subgroups within the N groups, wherein the position of the plurality of portable personal devices relative to one another is analyzed in order to assign the plurality of portable personal devices within one of the N groups to one of the X subgroups with respect to their order, neighborhood, or spatial distribution within the one group of the N groups, wherein the assignment to the X subgroups is alternating, segment-by segment, or following a pattern.

13. The method according to claim 1, wherein the setup includes integration into the radio network, allocation of a unique, identification in the radio network, allocation of a unique, address in the radio network or announcing at least one server address of the control system to each of the plurality of portable personal devices.

14. The method according to claim 1, wherein the method includes an adjustment or a synchronization of at least one clock generator of the control system with at least one clock generator in each of the plurality of portable personal devices in the context of setting up or before the time defined by the start instruction or the method performs the adjustment or the synchronization of at least one clock generator of the control system using the time of at least one public cellular network that is receivable on the event site.

15. The method according to claim 1, wherein the adjustment or the synchronization, is repeated several times or the first piece of information and the second piece of information are transferred to each of the plurality of portable personal devices a number of times in temporal sequence, thereby defining a new time by the start instruction or wherein the routine, sequence or process are stored together with audio signals or information about their generation and loaded into or by the control system for performing the method from the Internet, from a data memory or via a data connection, or independently of the radio network or the plurality of portable personal devices.

16. The method according to claim 1, wherein the plurality of portable personal devices are smart devices that each include a display.

17. The method according to claim 1, wherein the control system is adapted to communicate with the plurality of portable personal devices by means of a cellular network via the Internet.

18. The method according to claim 2, wherein the distributed emission of light is synchronized in time with the delivery of at least one audio output in a form of click track.

19. The method according to claim 2, wherein the distributed emission of light is synchronized in time with the delivery of at least one emission of light by a plurality of stationary light emission devices on the stage.

20. The method according to claim 6, wherein the at least one first piece of information and the at least one second piece of information together define the temporal sequence of the emission of light of different colors or define a routine for the temporal sequence of the emission of light of different colors.

* * * * *